US012612113B2

(12) United States Patent (10) Patent No.: US 12,612,113 B2
Satoi et al. (45) Date of Patent: Apr. 28, 2026

(54) VEHICLE REAR COMPONENT

(71) Applicant: TOYOTA JIDOSHA KABUSHIKI KAISHA, Aichi-ken (JP)

(72) Inventors: Taisuke Satoi, Okazaki (JP); Yuta Egawa, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 381 days.

(21) Appl. No.: 18/395,630

(22) Filed: Dec. 25, 2023

(65) Prior Publication Data

US 2024/0208587 A1 Jun. 27, 2024

(30) Foreign Application Priority Data

Dec. 26, 2022 (JP) ................................. 2022-207974

(51) Int. Cl.
B62D 25/20 (2006.01)
B62D 25/08 (2006.01)
(52) U.S. Cl.
CPC ......... B62D 25/2027 (2013.01); B62D 25/08 (2013.01); B62D 25/088 (2013.01); B62D 25/2036 (2013.01)
(58) Field of Classification Search
CPC ...... B62D 25/08; B62D 25/088; B62D 25/20; B62D 25/2027; B62D 25/2036
USPC .......... 296/187.11, 187.08, 187, 12, 193.04, 296/19.05, 193.06, 193.07, 193.09, 198, 296/203.03, 203.04, 29
See application file for complete search history.

(56) References Cited

U.S. PATENT DOCUMENTS

| | | | | | |
|---|---|---|---|---|---|
| 6,193,273 | B1* | 2/2001 | Novak | ................... | B62D 21/00 |
| | | | | | 280/781 |
| 6,299,240 | B1* | 10/2001 | Schroeder | ............ | B62D 29/008 |
| | | | | | 296/29 |
| 7,503,623 | B2* | 3/2009 | Favaretto | ............. | B62D 23/005 |
| | | | | | 280/798 |
| 2021/0101641 | A1* | 4/2021 | Kim | ........................ | B62D 21/03 |
| 2021/0179195 | A1* | 6/2021 | Kim | ........................ | B62D 21/11 |
| 2023/0391405 | A1* | 12/2023 | Yang | .................. | B62D 25/2036 |
| 2023/0399059 | A1* | 12/2023 | Lee | ....................... | B62D 21/155 |
| 2024/0132156 | A1* | 4/2024 | Fermér | .................. | B62D 25/20 |

(Continued)

FOREIGN PATENT DOCUMENTS

JP H06-286652 A 10/1994

OTHER PUBLICATIONS

DE 102022129260 with computer translation (Year: 2024).*

(Continued)

*Primary Examiner* — Gregory A Blankenship
(74) *Attorney, Agent, or Firm* — HAUPTMAN HAM, LLP

(57) ABSTRACT

The rear component is an integrally cast hollow member, a main body portion, a tower portion, a suspension member portion, and a front end block, the front end block is composed of a rear panel, a front panel, and a plate member, and is a closed cross-sectional member extending in the vehicle width direction, an end portion on the outside in the vehicle width direction is connected to the rear pillar and the rocker, a right side plate of the main body portion and a right side plate of the suspension member portion are connected to the rear panel, and a left side plate of the main body portion and a left side plate of the suspension member portion are connected to the front panel.

4 Claims, 6 Drawing Sheets

(56) References Cited

U.S. PATENT DOCUMENTS

| | | | |
|---|---|---|---|
| 2024/0208572 A1* | 6/2024 | Satoi | B62D 21/11 |
| 2024/0208573 A1* | 6/2024 | Satoi | B62D 21/11 |
| 2024/0208576 A1* | 6/2024 | Egawa | B62D 25/2027 |
| 2024/0208579 A1* | 6/2024 | Hata | B62D 25/2027 |
| 2024/0208584 A1* | 6/2024 | Satoi | B62D 25/04 |
| 2024/0208585 A1* | 6/2024 | Satoi | B62D 25/04 |
| 2024/0208587 A1* | 6/2024 | Satoi | B62D 21/11 |
| 2025/0121890 A1* | 4/2025 | Zhang | B62D 25/087 |
| 2025/0196931 A1* | 6/2025 | Lee | B62D 25/2027 |
| 2025/0382010 A1* | 12/2025 | Shimanaka | B62D 21/152 |
| 2025/0382012 A1* | 12/2025 | Shimanaka | B62D 21/155 |
| 2025/0382016 A1* | 12/2025 | Shimanaka | B62D 25/088 |

OTHER PUBLICATIONS

"Audi INVE_MEM_2009_114346_Audi R8 Intensive Use of Aluminium in Car Body Construction", Jun. 2009, https://www.researchgate.net/figure/Aluminium-Space-Frame-ASFR-Audi-R8-that-is-constructed-of-aluminium-alloy-extrusions_fig1_301223077, 18pp.
"Mercedes-AMG GT AMG Development No. 2 GT car with space frame structure", Jun. 24, 2019, https://car.motor-fan.jp/tech/10010224, 8pp.
"The 296 GT3, designed only to win, marks a new page in Ferrari's racing history! Non-hybrid V6 turbo, 600 hp", Jul. 30, 2022, https://intensive911.com/italian-car-brand/ferrari/260154/, 8pp.

* cited by examiner

A-A SECTION

B-B SECTION

VEHICLE REAR COMPONENT

CROSS-REFERENCE TO RELATED APPLICATION

This application claims priority to Japanese Patent Application No. 2022-207974 filed on Dec. 26, 2022, which is incorporated herein by reference in its entirety including the specification, claims, drawings, and abstract.

BACKGROUND

1. Technical Field

The present disclosure relates to a structure of a vehicle rear component. More specifically, the present disclosure relates to a structure of a vehicle rear component that is connected to a rocker and a rear pillar and that extends rearward of a vehicle.

2. Description of Related Art

In recent years, a vehicle structure has been studied in which skeleton structures of a vehicle are formed of cast products such as aluminum, and the formed skeleton structures of the vehicle are joined to form a vehicle body frame. For example, Patent Document 1 discloses a structure in which right and left rear frames, right and left suspension towers, and a cross member are integrated by casting. The right and left rear frames extend in the front-rear direction at both side portions of the vehicle rear. The cross member connects the right and left rear frames in the vehicle width direction.

SUMMARY

However, the cast product described in Patent Document 1 is a cast product having the same shape as the rear frame, the suspension tower, and the cross member composed of a plate member. Therefore, the thickness of the member is large, and there is room for improvement from the viewpoint of weight reduction of the vehicle.

In view of this, an object of the present disclosure is to reduce the weight and to improve the strength and rigidity of a vehicle.

A vehicle rear component of the present disclosure is connected to a rear end of a rocker and a rear pillar and that extends rearward of a vehicle. The vehicle rear component includes: a body portion; a tower portion; a suspension member portion; and a front end block. The vehicle rear component is an integrally cast hollow member. The body portion extends in a vehicle front-rear direction, and includes a front end that is connected to the front end block. The body portion is a closed section composed of an upper plate, a lower plate, a vehicle width direction outer plate, and a vehicle width direction inner plate. The tower portion is connected above the body portion, and includes a space for accommodating a portion of a suspension device. The suspension member portion extends in the vehicle front-rear direction below the body portion, and is composed of an outer plate on an outer side in a vehicle width direction, an inner plate on an inner side in the vehicle width direction, and a bottom plate. The outer plate is connected to the vehicle width direction outer plate of the body portion, and the inner plate is connected to the vehicle width direction inner plate of the body portion. The suspension member portion includes a front end that is connected to the front end block. The front end block is composed of a rear panel, a front panel, and a plate member, and the plate member connects the rear panel and the front panel in the vehicle front-rear direction. The front block is a closed section member extending in the vehicle width direction, and includes an end portion on an outer side in the vehicle width direction that is connected to the rear pillar and the rocker. The vehicle width direction outer plate of the body portion and the outer plate of the suspension member portion are connected to the rear panel. The vehicle width direction inner plate of the body portion and the inner plate of the suspension member portion are connected to the front panel.

This makes it possible to reduce the weight of the vehicle and to improve the strength and rigidity of the vehicle. In addition, the impact load at the time of a rear collision can be smoothly transmitted to the rocker.

In the vehicle rear component of the present disclosure, the rear panel may be connected to a rear surface of a rear end plate covering a rear end surface of the rocker.

Accordingly, the impact load at the time of the rear collision can be transmitted to the entire section of the rocker.

The vehicle rear component of the present disclosure may include an arm bracket to be coupled with an arm of the suspension device, the arm bracket disposed on a vehicle width direction outer surface of the body portion and a vehicle width direction outer surface of the suspension member portion The body portion may include a first connecting member that connects the vehicle width direction outer plate and the vehicle width direction inner plate in the vehicle width direction at a position where the arm bracket is provided.

Accordingly, the vehicle rear component of the present disclosure can reduce the weight of the vehicle and improve the strength and rigidity of the portion where the body portion and the arm of the suspension device are connected.

The vehicle rear component of the present disclosure may include a transaxle mount bracket for connecting a transaxle on a vehicle width direction inner surface of the body portion and a vehicle width direction inner surface of the suspension member portion. The body portion and the suspension member portion may include a second connecting member respectively that connects the vehicle width direction outer plate and the vehicle width direction inner plate in the vehicle width direction at a position where the transaxle mount bracket is provided.

Accordingly, the vehicle rear component of the present disclosure can reduce the weight of the vehicle and improve the strength and rigidity of the portion where the body portion and the transaxle are connected and the portion where the suspension member portion and the transaxle are connected.

The present disclosure can reduce the weight of a vehicle and improve the strength and rigidity of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
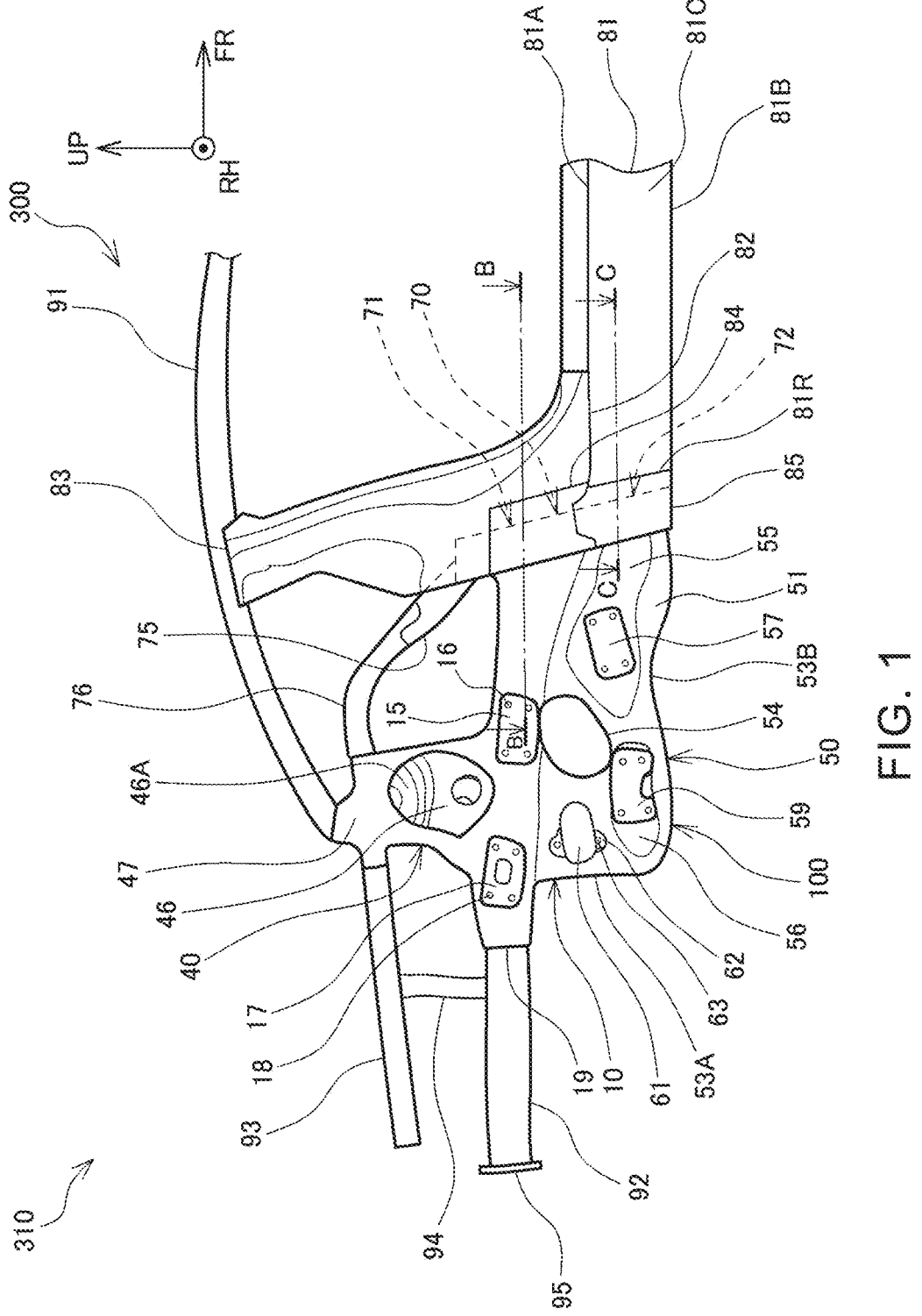
FIG. 1 is a side view illustrating a rear structure of a vehicle including a rear component of an embodiment.

Hereinafter, a vehicle rear component 100 (hereinafter, referred to as a rear component 100) according to an embodiment will be described with reference to the drawings. The rear structure 310 of the vehicle 300 with the rear component 100 will be described first with reference to FIG. 1. In the following description, the rear structure 310 of the right side portion of the vehicle 300 will be described. The left rear structure 310 of the vehicle 300 is bilaterally symmetric with the right rear structure 310. Therefore, the description of the rear structure 310 of the left side portion is omitted. The arrows FR, the arrows UP, and the arrows RH shown in the drawings indicate the front side, the upper side, and the right side of the vehicle 300, respectively. In addition, the opposite directions of the arrow FR, UP, RH indicate the rear side, the lower side, and the left side. Hereinafter, when the description is simply made using the front-rear, left-right, and up-down directions, the front-rear direction of the vehicle 300, the left-right direction of the vehicle 300, and the up-down direction of the vehicle 300 are assumed to be illustrated unless otherwise specified.

As shown in FIG. 1, the rear structure 310 of the vehicle 300 includes a rocker 81, a rear pillar 84, a rear pillar outer 82, a rear component 100, a rear member 92, a cross connecting member 93, a support column 94, a connecting member 76, a roof rail 91, and a rear end plate 85.

The rocker 81 is a structural member extending in the front-rear direction at a side end portion of the vehicle 300. The rocker 81 includes an upper plate 81A, a lower plate 81B, a right plate 81C, and a left plate 81D (see FIG. 6). The rocker 81 has a rectangular closed cross-section shape. A rear pillar 84 is attached to the upper surface of the upper plate 81A on the rear end portion 81R of the rocker 81. The rear pillar outer 82 is connected to the upper portion and the front of the rear pillar 84. The rear pillar outer 82 is connected to the upper surface of the upper plate 81A of the rocker 81. A rear end plate 85 covering the rear end face 81E is attached to the rear end face 81E of the rocker 81 (see FIG. 6).

The rear component 100 is connected to the rear end of the rocker 81 and the rear pillar 84 and extends to the rear of the vehicle. The rear component 100 is an integrally cast hollow member. The rear component 100 includes a body portion 10, a tower portion 40, a suspension member portion 50, and a front end block 70. Details of the structure of the rear component 100 will be described later with reference to FIGS. 2 to 4.

The rear member 92 is connected to the rear end 19 of the rear component 100. The rear member 92 is a structural member having a closed cross-section extending rearward of the vehicle. A rear end plate 95 is attached to the rear end of the rear member 92.

The cross connecting member 93 connects the rear ends of the upper bases 47 of the tower portions 40 of the left and right rear components 100 to the left and right. The support column 94 is a closed-section member that connects the upper surface of the rear member 92 and the lower surface of the cross-connecting member 93. The connecting member 76 is a closed section member. The connecting member 76 connects the front end of the upper base 47 of the tower portion 40 and the upper portion of the front end block 70.

The roof rail 91 is a structural member constituting a roof of the vehicle 300. The roof rail 91 is a longitudinal member having a closed cross section. The roof rail 91 extends in the front-rear direction at an upper side end portion of the vehicle 300. The central portion of the roof rail 91 is connected to the upper end 83 of the rear pillar outer 82. The roof rail 91 extends from the upper end 83 of the rear pillar outer 82 toward the upper base 47 of the tower portion 40 toward the vehicle obliquely rearward direction. The rear end of the roof rail 91 is connected to the upper base 47 of the tower portion 40.

Next, the structure of the rear component 100 will be described with reference to FIGS. 2 to 4. As previously discussed, the rear component 100 is a hollow member that is integrally cast. The rear component 100 includes a body portion 10, a tower portion 40, a suspension member portion 50, and a front end block 70.

Figure 2:
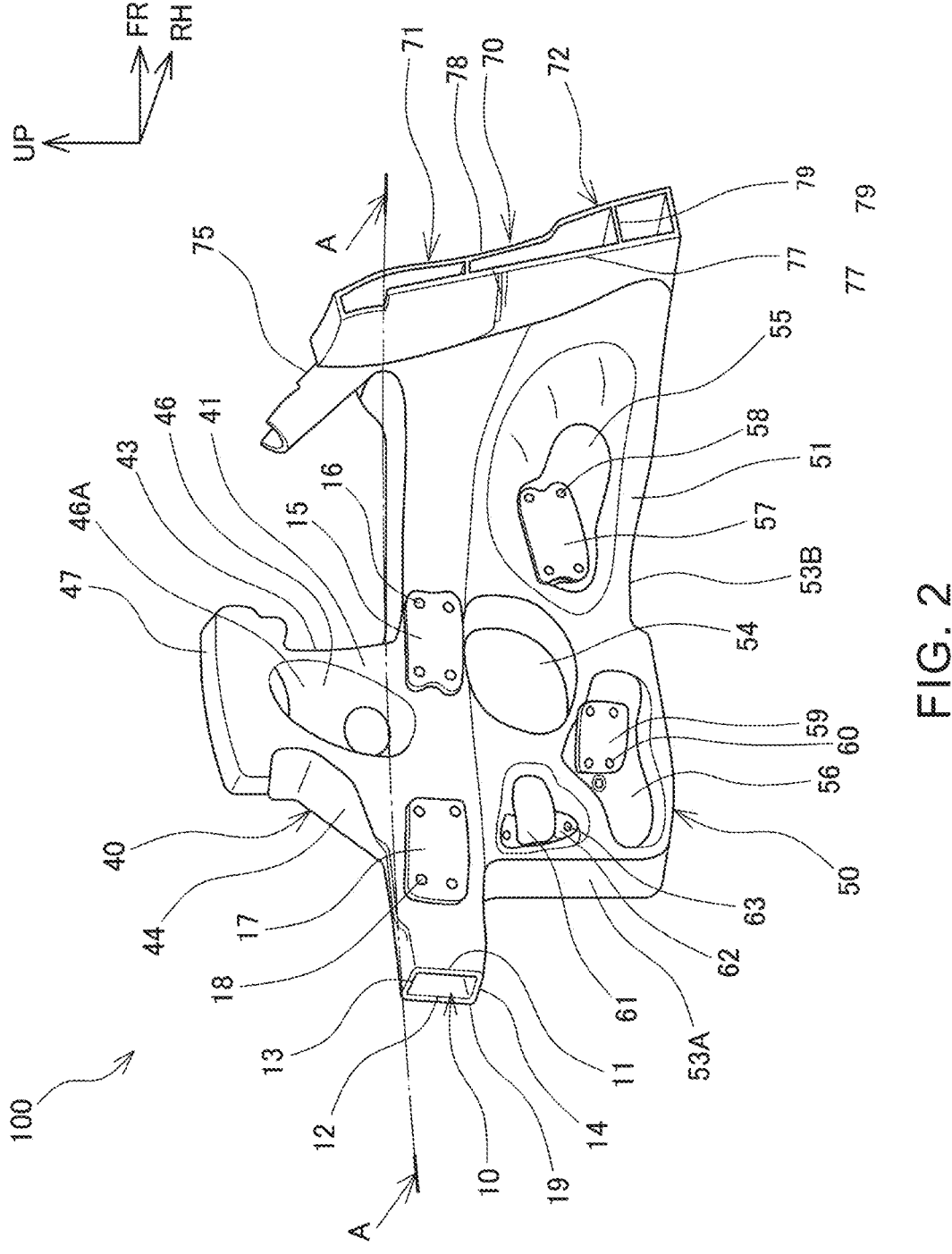
FIG. 2 is a perspective view illustrating a rear component of the embodiment.

As shown in FIG. 2, at least a part of the body portion 10 has a closed cross section. The body portion 10 is a portion extending in the vehicle front-rear direction. The front end of the body portion 10 is connected to the upper half portion 71 of the front end block 70. The general portion of the body portion 10 is a square closed section portion. A general portion of the body portion 10 includes an upper plate 13, a lower plate 14, a right side plate 11, and a left side plate 12. Here, the right side plate 11 defines an outer plate in the vehicle width direction. The left side plate 12 constitutes an inner side plate in the vehicle width direction. Note that a portion (a portion other than the general portion) of the body portion 10 that is connected to the tower portion 40 will be described later.

The closed cross-sectional shape of the general portion of the body portion 10 and the closed cross-sectional shape of the rear member 92 are the same shape. Accordingly, when the rear member 92 is connected to the rear end 19 of the body portion 10, the body portion 10 and the rear member 92 constitute a rear side member. The rear side member is a structural member extending from the rear pillar 84 toward the rear of the vehicle.

Bases 15 and 17 are provided on the surface of the right side plate 11. Here, the surface of the right side plate 11 is an outer surface of the body portion 10 in the vehicle width direction. Arm brackets (not shown) to which upper arms (not shown) of suspension devices (not shown) are connected are fixed to the bases 15 and 17. Bolt holes 16 and 18 for fixing the arm brackets are provided in the bases 15 and 17. As shown in FIG. 3, a base 64A is provided on the left side plate 12. Here, the surface of the left side plate 12 is the vehicle width direction inner side surface of the body portion 10. The base 64A is a part to which a transaxle mount bracket (not shown) is fixed. The transaxle mount bracket connects the upper portion of the transaxle (not shown) to the body portion 10. The base 64A is provided with bolt-hole 65A for securing the transaxle mount brackets.

Figure 4:
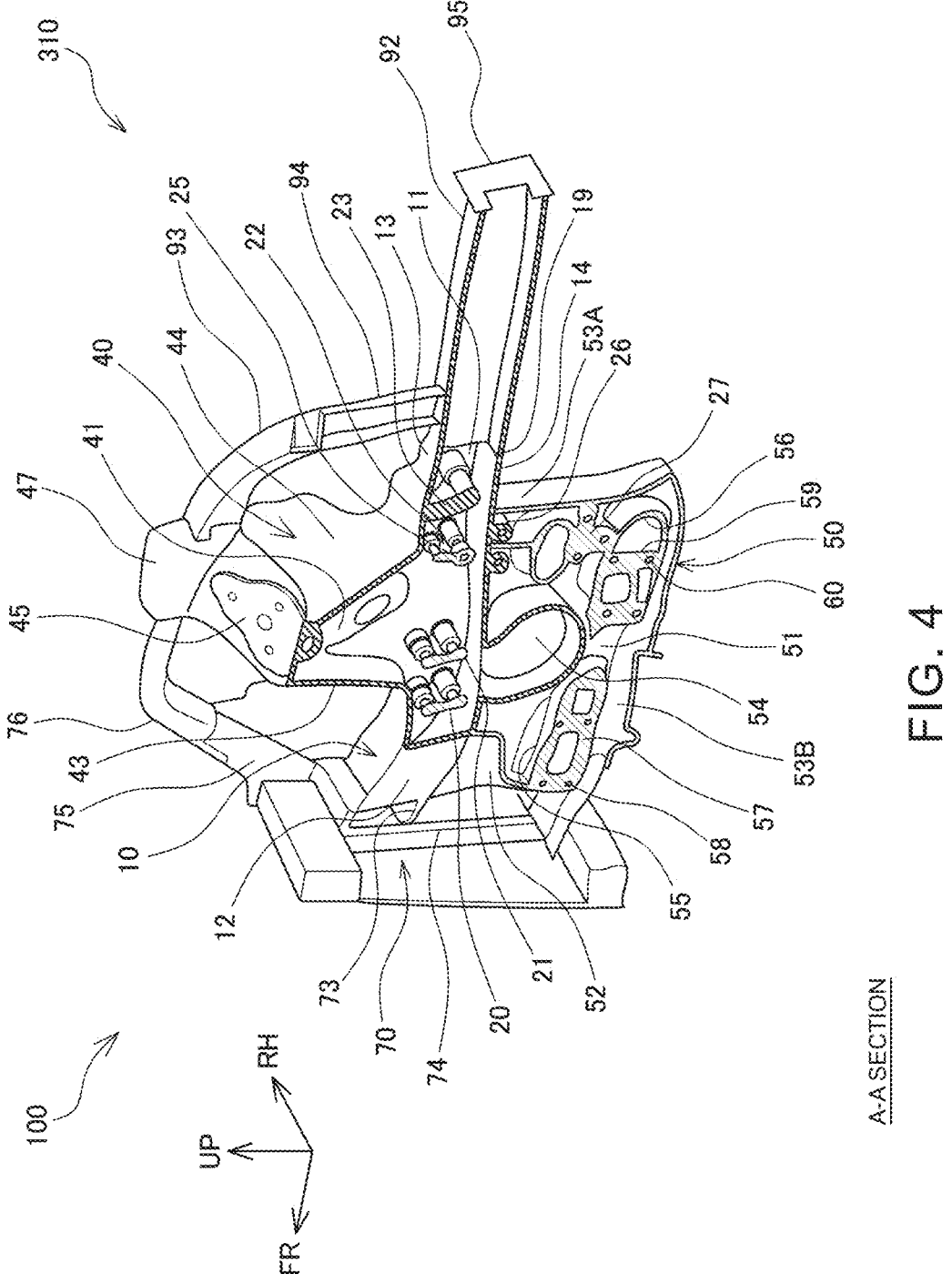
FIG. 4 is a cross-sectional perspective view of the rear component showing A-A cross-section shown in FIG. 2.

Further, as shown in FIG. 4, first connecting members 20 to 23 are provided in the body portion 10. The first connecting members 20 to 23 connect the right side plate 11 and the left side plate 12 in the vehicle width direction at positions where the bolt holes 16 and 18 are provided or at positions where the arm brackets are provided. A second connecting member 25 is provided inside the body portion 10. The second connecting member 25 connects the right side plate 11 and the left side plate 12 to each other at a position where the bolt-hole 65A is provided or at a position where the transaxle mount bracket is provided.

Returning to FIG. 2, at least a portion of the suspension member portion 50 has a closed cross-section. A portion extending in the vehicle front-rear direction below the body portion 10. The front end of the suspension member portion 50 is connected to the lower half portion 72 of the front end block 70. As illustrated in FIGS. 2 to 4, the suspension member portion 50 includes a right side plate 51, a left side plate 52, a rear plate 53A, and a bottom plate 53B. The suspension member portion 50 is a hollow member having a closed section. The closed section is right, left, rear, front, lower, upper, and right side plate 51, the left side plate 52, a rear plate 53A, a front end block 70, a bottom plate 53B, and a lower plate 14 of the body portion 10, right, left, rear, front, lower, upper are surrounded. Here, the right side plate 51 constitutes the vehicle width direction outer plate of the suspension member portion 50. Further, the left side plate 52 constitutes the vehicle width direction inner plate of the suspension member portion 50.

As shown in FIG. 2, a cylindrical opening 54 through which a drive shaft (not shown) of the vehicle 300 passes is provided in the center of the suspension member portion 50. A recessed portion 55 recessed in a mortar shape is provided in front of the right side plate 51. The bottom of the recessed portion 55 is flat. A base 57 is provided at the bottom. Further, a recessed portion 56 recessed in a stepped manner from the surface of the right side plate 51 is provided on the rear lower side of the right side plate 51. A base 59 is provided at the bottom of the recessed portion 56. An oval opening 61 is provided on the rear upper side of the right side plate 51. The peripheral edge portion of the opening 61 and the surface of the right side plate 51 are connected by an inclined curved surface. A base 62 is provided at an upper portion and a lower portion of the opening 61, respectively. The bases 57 and 59 are portions to which arm brackets (not shown) are fixed. The arm bracket is connected to a lower arm (not shown) of a suspension device (not shown). The base 62 is fixed to an arm bracket (not shown) to which a middle arm (not shown) of the suspension device is connected. Bolt holes 58, 60, and 63 for fixing the arm brackets are provided in the bases 57, 59, and 60, respectively. Here, the bottom portion of the recessed portion 55 and the bottom portion of the recessed portion 56 are the vehicle width direction outer side surfaces of the suspension member portion 50.

Figure 3:
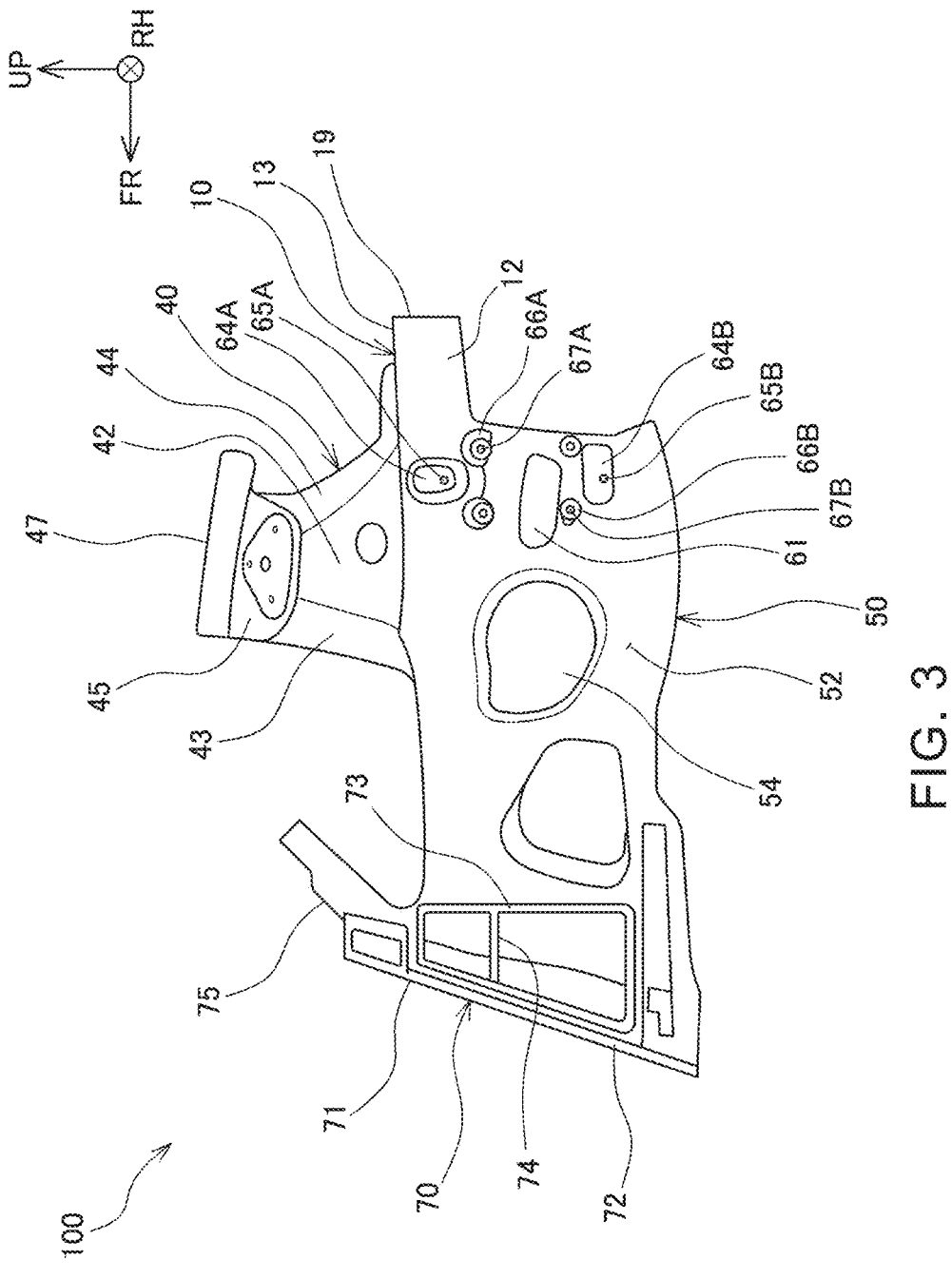
FIG. 3 is a side view illustrating a side surface of the rear component member on the inner side in the vehicle width direction according to the embodiment.

As shown in FIG. 3, a base 66A, 64B, 66B is provided on a rear upper end portion of the left side plate 52. The base 66A is a part to which a transaxle mount bracket (not shown) is fixed. The transaxle mount bracket connects the upper portion of the transaxle (not shown) to the body portion 10. The base 64B, 66B is a part to which a transaxle mount bracket (not shown) is fixed. The transaxle mount bracket connects a lower portion of the transaxle (not shown) to the body portion 10. The base 66A, 64B, 66B is provided with bolt-hole 67A, 65B, 67B for fixing the transaxle mount brackets. Here, the surface of the left side plate 52 is the vehicle width direction inner side surface of the suspension member portion 50.

As shown in FIG. 4, the second connecting members 26 and 27 are provided inside the suspension member portion 50. The second connecting members 26 and 27 connect the right side plate 51 and the left side plate 52 to each other in the vehicle-width direction at a position where the bolt-hole 67A, 65B, 67B is provided or at a position where the transaxle mount bracket is provided.

As illustrated in FIGS. 2 to 4, the tower portion 40 is connected to the upper side of the body portion 10. The tower portion 40 includes a recess 46 for receiving a portion of a suspension (not shown). The tower portion 40 includes a right side plate 41, a left side plate 42, a front plate 43, a rear plate 44, and a ceiling plate 45. The right side plate 41, the left side plate 42, the front plate 43, and the rear plate 44 constitute a closed cross-sectional structure extending upward from the body portion 10. An upper base 47 is provided at a right end portion of the ceiling plate 45. As described above, the roof rail 91, the connecting member 76, and the cross connecting member 93 are connected to the upper base 47. Here, the right side plate 41 and the left side plate 42 constitute an inner plate inside the body portion 10 in the vehicle width direction and an outer plate outside the body portion 10 in the vehicle width direction.

As shown in FIG. 4, the upper plate 13 is cut out at a portion (a portion other than the general portion) of the body portion 10 that is connected to the tower portion 40. The upper plate 13 is divided into a front upper plate 13A and a rear upper plate 13B. The front upper plate 13A is located in front of a part connected to the tower portion 40. The rear upper plate 13B is located rearward of a part connected to the tower portion 40. The lower end of the front plate 43 is connected to the front upper plate 13A so as to rise from the front upper plate 13A of the upper plate 13. The lower end of the rear plate 44 is connected to the rear upper plate 13B so as to rise from the rear upper plate 13B of the upper plate 13. The right side plate 41 is connected to the right side plate 11 of the body portion 10. Similarly, the left side plate 42 is connected to the left side plate 12 of the body portion 10. The upper end of the right side plate 41, the upper end of the left side plate 42, the upper end of the front plate 43, and the upper end of the rear plate 44 are connected by a ceiling plate 45. The lower plate 14 of the body portion 10 passes from the front end block 70 to the rear end 19 in the front-rear direction. Accordingly, as shown in FIG. 4, the tower portion 40 and the body portion 10 are composed of a front plate 43, a rear plate 44, a ceiling plate 45, a lower plate 14, right side plates 11 and 41, and left side plates 12 and 42. The tower portion 40 and the body portion 10 have a closed cross-sectional shape extending in the vehicle front-rear direction.

As shown in FIG. 2, the front end block 70 is a square closed cross-section member. The front end of the body portion 10 and the front end of the suspension member portion 50 of the front end block 70 are connected to each other. The front end block 70 includes a rear panel 77 at the rear of the vehicle, a front panel 78 at the front of the vehicle, and a plate member 79. The plate member 79 connects the rear panel 77 and the front panel 78 in the vehicle front-rear direction. Further, a receiving seat 75 to which the front end of the connecting member 76 is connected is provided at an upper portion of the front end block 70.

Figure 5:
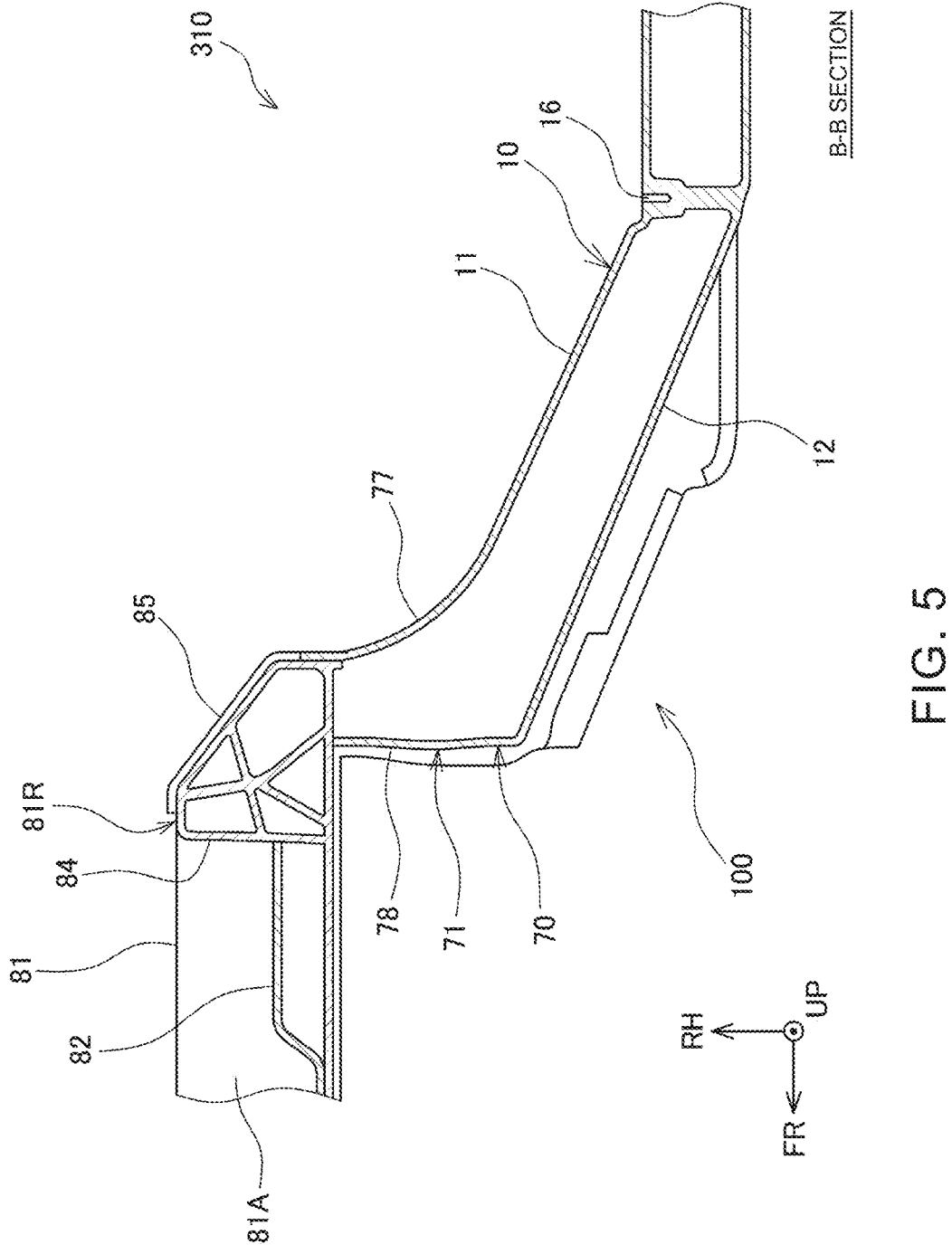
FIG. 5 is a cross-sectional view of B-B shown in FIG. 1, showing the connecting portion between the rear component and the rear pillar.

The body portion 10 is connected to the upper half portion 71 of the front end block 70. As shown in FIG. 5, the rear panel 77 of the upper half portion 71 curves toward the rear of the vehicle as it goes inward in the vehicle width direction. The rear panel 77 of the upper half portion 71 is connected to the front end of the right side plate 11 of the body portion 10. Also, The front panel 78 of the upper half portion 71 extends in the vehicle width direction, and the inner end in the vehicle width direction is connected to the front end of the left side plate 12 of the body portion 10. The

Figure 6:
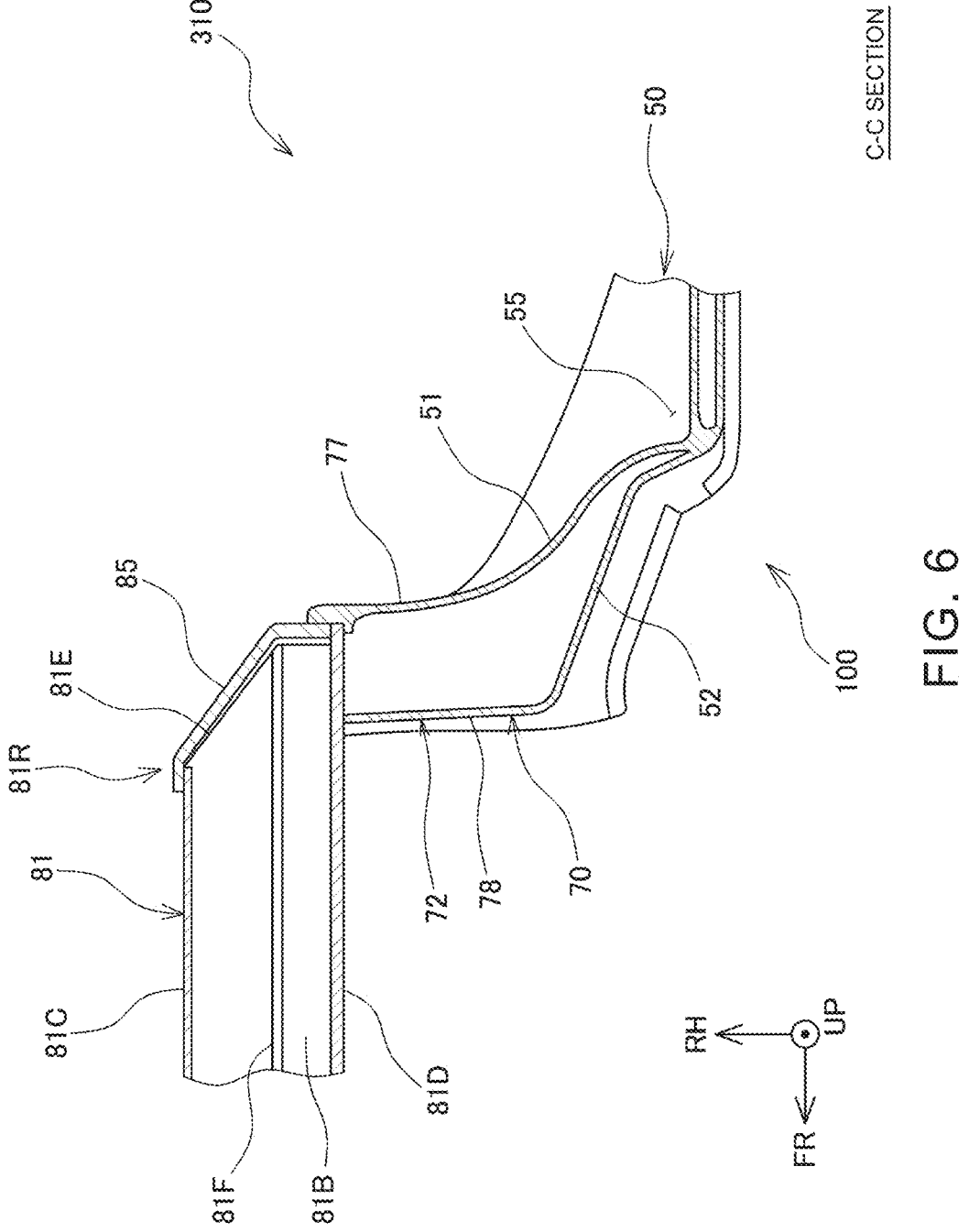
FIG. 6 is a cross-sectional view of C-C shown in FIG. 1, showing a connecting portion between a rear component member and a rocker.

7 suspension member portion 50 is connected to the lower half portion 72 of the front end block 70. As shown in FIG. 6, the rear panel 77 of the lower half portion 72 is curved toward the vehicle rear side toward the vehicle width direction inner side, and is connected to the front end of the right side plate 51 of the suspension member portion 50. Also. The front panel 78 of the lower half portion 72 extends in the vehicle width direction, and the inner end in the vehicle width direction is connected to the front end of the left side plate 52 of the suspension member portion 50.

As described above, the right side plate 11 of the body portion 10 and the right side plate 51 of the suspension member portion 50 are connected to the rear panel 77. The left side plate 12 of the body portion 10 and the left side plate 52 of the suspension member portion 50 are connected to the front panel 78. As shown in FIG. 3, the left side plate 52 of the suspension member portion 50 and the front end block 70 are connected by ribs 73 and 74.

Next, the connection of the rocker 81, the rear pillar outer 82, the rear pillar 84, the rear end plate 85, and the front end block 70 will be described with reference to FIGS. 5 and 6. As described above, the rocker 81 has a square closed cross-section including an upper plate 81A, a lower plate 81B, a right plate 81C, and a left plate 81D. A rear pillar 84 is attached to an upper surface of the upper plate 81A. The rear pillar outer 82 is connected to the upper part and the front part of the rear pillar 84 and the upper surface of the upper plate 81A.

As shown in FIG. 5, the front panel 78 of the upper half portion 71 of the front end block 70 is connected to the left side surface of the rear pillar 84. Further, the rear panel 77 of the upper half portion 71 is connected to the left rear corner of the rear pillar 84 and the rear surface.

As shown in FIG. 6, a rear end plate 85 is provided on the rear end face 81E of the rocker 81 so as to cover the rear end face 81E of the rocker 81. The rear end plate 85 is connected to an upper plate 81A of the rocker 81, a lower plate 81B, a right plate 81C, a left plate 81D, and a middle rib 81F extending in the front-rear direction inside the rocker 81.

The front panel 78 of the lower half portion 72 of the front end block 70 is connected to the side surface of the rocker 81 on the left plate 81D. The rear panel 77 of the lower half portion 72 is connected to the left plate 81D of the rocker 81 and the rear surface of the rear end plate 85.

As described above, the right side plate 11 of the body portion 10 and the right side plate 51 of the suspension member portion 50 are connected to the rear panel 77 of the front end block 70. The left side plate 12 of the body portion 10 and the left side plate 52 of the suspension member portion 50 are connected to the front panel 78 of the front end block 70. The rear panel 77 of the front end block 70 and the outer end of the front panel 78 in the vehicle width direction extend outward in the vehicle width direction and are connected to the left side of the rocker 81 and the rear pillar 84.

With the above configuration, in the rear component 100, a part of the impact load input to the rear member 92 at the time of the rear collision flows from the right side plate 11 and the left side plate 12 of the body portion 10 to the rear panel 77 and the front panel 78 of the front end block 70. A part of the impact load is transmitted from the rear panel 77 and the front panel 78 to the rocker 81 via the rear pillar 84. Further, a part of the impact load at the time of the rear collision flows from the right side plate 51 and the left side plate 52 of the suspension member portion 50 to the rear panel 77 and the front panel 78 of the front end block 70. A part of the impact load is transmitted from the rear panel 77 and the front panel 78 to the rocker 81. At this time, the impact load is transmitted to the upper plate 81A, the lower plate 81B, the right plate 81C, the left plate 81D, and the middle rib 81F of the rocker 81 through the rear end plate 85 attached to the rear end face 81E of the rocker 81.

In this way, the rear component 100 can smoothly transmit the impact load at the time of the rear collision to the rocker 81. In addition, the rear component 100 can transmit the impact load at the time of the rear collision to the entire cross section of the rocker 81. As a result, the rear component 100 can reduce the weight of the vehicle 300 and improve the strength and rigidity of the vehicle 300.

Further, since the rear component 100 includes the first connecting members 20 to 23, the weight of the vehicle 300 can be reduced, and the strength and rigidity of the portion where the body portion 10 and the arm of the suspension device are connected can be improved.

Further, since the rear component 100 includes the second connecting members 25 to 27, the weight of the vehicle 300 can be reduced, and the strength and rigidity of the portion to which the body portion 10 and the transaxle are connected and the portion to which the suspension member portion 50 and the transaxle are connected can be improved.

What is claimed is:

1. A vehicle rear component, the vehicle rear component comprising:

a body portion;

a tower portion;

a suspension member portion; and a front end block, wherein:

the vehicle rear component is an integrally cast hollow member;

the body portion:

extends in a vehicle front-rear direction, is a closed section composed of an upper plate, a lower plate, a vehicle width direction outer plate, and a vehicle width direction inner plate, and includes a front end that is connected to the front end block;

the tower portion:

is connected above the body portion, and includes a space for accommodating a portion of a suspension device;

the suspension member portion:

extends in the vehicle front-rear direction below the body portion, is composed of an outer plate on an outer side in a vehicle width direction, an inner plate on an inner side in the vehicle width direction, and a bottom plate, the outer plate being connected to the vehicle width direction outer plate of the body portion, and the inner plate being connected to the vehicle width direction inner plate of the body portion, and includes a front end that is connected to the front end block;

the front end block:

is composed of a rear panel, a front panel, and a plate member, the plate member connecting the rear panel and the front panel in the vehicle front-rear direction, is a closed section member extending in the vehicle width direction, and includes an end portion on an outer side in the vehicle width direction, the end portion being connected to a rear pillar and a rocker;

the vehicle width direction outer plate of the body portion and the outer plate of the suspension member portion are connected to the rear panel; and the vehicle width direction inner plate of the body portion and the inner plate of the suspension member portion are connected to the front panel.

2. The vehicle rear component according to claim 1, wherein the rear panel is connected to a rear surface of a rear end plate covering a rear end surface of the rocker.

3. The vehicle rear component according to claim 2, further comprising an arm bracket for coupling with an arm of the suspension device, the arm bracket disposed on a vehicle width direction outer surface of the body portion and a vehicle width direction outer surface of the suspension member portion, wherein the body portion includes a first connecting member that connects the vehicle width direction outer plate and the vehicle width direction inner plate in the vehicle width direction at a position where the arm bracket is provided.

4. The vehicle rear component according to claim 3, further comprising a transaxle mount bracket for connecting a transaxle on a vehicle width direction inner surface of the body portion and a vehicle width direction inner surface of the suspension member portion, wherein the body portion and the suspension member portion include a second connecting member respectively that connects the vehicle width direction outer plate and the vehicle width direction inner plate in the vehicle width direction at a position where the transaxle mount bracket is provided.

\* \* \* \* \*